United States Patent
Park

(10) Patent No.: US 8,909,419 B2
(45) Date of Patent: Dec. 9, 2014

(54) APPARATUS AND METHOD FOR HORN CONTROL USING TOUCH PATTERN

(75) Inventor: Ki Ru Park, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 259 days.

(21) Appl. No.: 13/468,392

(22) Filed: May 10, 2012

(65) Prior Publication Data

US 2013/0151069 A1   Jun. 13, 2013

(30) Foreign Application Priority Data

Dec. 7, 2011 (KR) .................. 10-2011-0130035

(51) Int. Cl.
*G06F 7/00* (2006.01)

(52) U.S. Cl.
USPC .............. 701/36; 701/37; 84/713; 340/7.21

(58) Field of Classification Search
USPC ............ 701/37; 84/713; 340/7.21; 345/156, 345/173; 381/77, 122; 178/18.03; 180/197
See application file for complete search history.

(56) References Cited

U.S. PATENT DOCUMENTS

| | | | | |
|---|---|---|---|---|
| 3,740,449 | A * | 6/1973 | Southard | 84/713 |
| 4,644,352 | A * | 2/1987 | Fujii | 340/7.21 |
| 8,199,114 | B1 * | 6/2012 | Jaeger et al. | 345/173 |
| 2005/0052426 | A1 * | 3/2005 | Hagermoser et al. | 345/173 |
| 2005/0192727 | A1 * | 9/2005 | Shostak et al. | 701/37 |
| 2006/0180371 | A1 * | 8/2006 | Breed et al. | 180/197 |
| 2006/0284839 | A1 * | 12/2006 | Breed et al. | 345/156 |
| 2009/0128504 | A1 * | 5/2009 | Smith | 345/173 |
| 2009/0243998 | A1 * | 10/2009 | Wang | 345/156 |
| 2010/0025123 | A1 * | 2/2010 | Lee et al. | 178/18.03 |
| 2012/0051561 | A1 * | 3/2012 | Cohen et al. | 381/122 |
| 2012/0121103 | A1 * | 5/2012 | Cohen et al. | 381/77 |

FOREIGN PATENT DOCUMENTS

| | | | |
|---|---|---|---|
| JP | 2005071672 | A | 3/2005 |
| JP | 2007091050 | A | 4/2007 |
| JP | 2009262667 | A | 11/2009 |
| JP | 2011131686 | A | 7/2011 |
| KR | 1998029540 | A | 7/1998 |
| KR | 20020063313 | A | 8/2002 |
| KR | 10-2005-0051514 | | 6/2005 |
| KR | 10-2009-0131530 | | 12/2009 |

* cited by examiner

*Primary Examiner* — James Trammell
*Assistant Examiner* — Sanjeev Malhotra
(74) *Attorney, Agent, or Firm* — Edwards Wildman Palmer LLP; Peter F. Corless

(57) ABSTRACT

Disclosed is an apparatus and method for outputting horn sounds using a touch pattern. The apparatus includes: a storage unit configured to store horn sounds matched to various touch patterns; a touch detection unit equipped in a steering wheel of a vehicle configured to detect a driver's touch; a touch pattern recognition unit configured to recognize a driver's touch pattern detected by the touch detection unit; a controller configured to identify a horn sound corresponding to the touch pattern recognized by the touch pattern recognition unit from the storage unit, and to send it to a horn output unit; which allows a user to control what sounds are output by the horn using nothing more than simple touch gestures. Additionally, the apparatus and method enable a user to produce different horn outputs to correspond to different situations.

15 Claims, 3 Drawing Sheets

APPARATUS AND METHOD FOR HORN CONTROL USING TOUCH PATTERN

CROSS-REFERENCES TO RELATED APPLICATIONS

This application claims priority under 35 U.S.C. §119(a) to Korean patent application number 10-2011-0130035, filed on Dec. 7, 2011, which is hereby incorporated by reference in its entirety.

BACKGROUND OF THE INVENTION

1. Field of the Invention

The present invention relates to an apparatus and a method for horn control using a touch pattern. More particularly, the present invention relates to an apparatus and a method for horn control using a touch pattern that is capable of recognizing a variety of touch patterns input by a driver through a capacitive touch sensor equipped in a steering wheel, and outputting a corresponding horn sound.

2. Description of the Related Art

Most vehicles are equipped with a horn output device, which is able to produce a loud sound (e.g., honking a horn) that provides a strong warning to other drivers in particular situations, such as an emergency situation. Horns are also typically used to call attention to a vehicle in a non-emergency situation. For example, a horn may be used to alert the driver of a nearby vehicle that is in a stopped/parked situation, or to alert a pedestrian in an alley. Horns may also be used generally to simply notify others of the location of the vehicle. However, the conventional art horn output device was primarily designed to give a strong warning to the other party in an emergency situation; consequently, conventional art horn output devices typically produce a uniform and strong sound. This is disadvantageous in situations where a driver merely wants to call attention to the location of the vehicle, or to prompt another driver to take action (e.g., when a traffic light has turned green and the preceding driver has not noticed). In other words, the conventional horn output device outputs a horn which causes discomfort even when it is just being used to call attention to the vehicle. Disadvantageously, this may cause discomfort to the people around. In particular, when children are playing in front of a vehicle that is driving down an alley, it would be desirable to be able to use a horn that produces a softer sound, so as not to startle the children. Unfortunately, conventional art horn output devices do not provide this option. Accordingly, there is a need in the art for a horn output device that allows a user to respond to different situations with different horn outputs.

SUMMARY OF THE INVENTION

The present invention provides an apparatus and a method for horn control using a touch pattern, which is capable of recognizing a variety of touch patterns input by a driver through a capacitive touch sensor equipped in a steering wheel of a vehicle. The different touch patterns function to output corresponding horn sounds, thereby enabling an appropriate horn to be honked. Advantageously, this method does not require a complicated user interface (e.g. an increased number of switches).

According to an exemplary aspect of the present invention, a horn control apparatus using a touch pattern includes: a storage unit configured to store horn sounds matched to various touch patterns; a touch detection unit equipped in a steering wheel of a vehicle configured to detect a driver's touch; a touch pattern recognition unit configured to recognize a driver's touch pattern detected by the touch detection unit; a controller configured to identify a horn sound corresponding to the touch pattern recognized by the touch pattern recognition unit from the storage unit and to send it to a horn output unit; and a horn output unit configured to output the horn sound sent from the controller.

According to another aspect of the present invention, a horn control method using a touch pattern includes: storing horn sounds matched to various touch patterns in a storage unit; detecting a driver's touch by a touch detection unit equipped in a steering wheel of a vehicle; recognizing the touch pattern of the driver's touch by a touch pattern recognition means; searching a horn sound corresponding to the recognized touch pattern in the storage unit by a controller; and outputting the searched horn sound by a horn output unit.

BRIEF DESCRIPTION OF THE DRAWINGS

The objects, features and advantages of the present invention will be more apparent from the following detailed description in conjunction with the accompanying drawings, in which.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

DETAILED DESCRIPTION OF EXEMPLARY EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
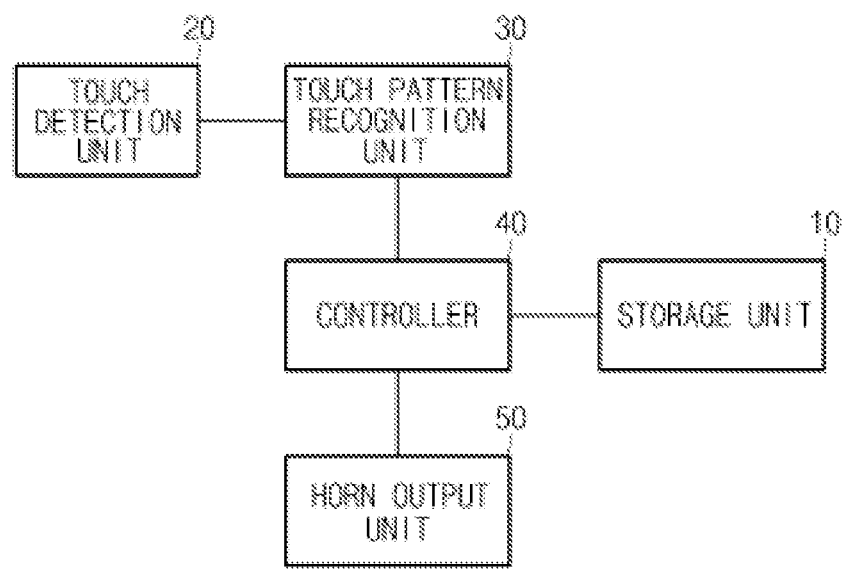
FIG. 1 is a block diagram illustrating a configuration of a horn control apparatus using a touch pattern according to an exemplary embodiment of the present invention.

FIG. 1 is a block diagram illustrating a configuration of a horn control apparatus for horn control using a touch pattern according to an exemplary embodiment of the present invention. As shown in FIG. 1, a horn control apparatus using a touch pattern according to an exemplary embodiment of the present invention includes a storage unit 10, a touch detection unit 20, a touch pattern recognition unit 30, a controller 40, and a horn output unit 50. Each element will be described in detail.

The storage unit 10 stores a variety of different horn sounds matched to various touch patterns. For example, the storage unit may store a bicycle song recorded by a voice of a favorite children's cartoon character such as Mickey Mouse saying "I'll pass on the left" or "thank you.". The storage unit stores a variety of songs, voices, music, and sound effects which not only perform the original purpose of a horn, but also perform new functions such as, for example, providing instructions or thanks to other drivers, while giving no discomfort to the people around. It is also contemplated within the scope of the invention that the horn control apparatus may further comprise an input device configured to allow a user to input and store the user's favorite horn sounds (e.g., music, phrases, sounds, and the like) on the storage unit.

In an exemplary embodiment, the touch detection unit 20 may be implemented as a capacitive touch panel, or at least two or more capacitive touch sensors, and may be equipped in a steering wheel of a vehicle to detect a driver's touch.

The touch pattern recognition unit 30 recognizes the drive's touch pattern detected by the touch detection unit 20. For example, it detects a driver's touch, which is maintained over a critical time, the number of contact points of a driver's touch, and a driver's touch motion such as, for example, a left or right motion, and up or down motion, a clockwise motion, and/or a counter clockwise motion.

Figure 2:
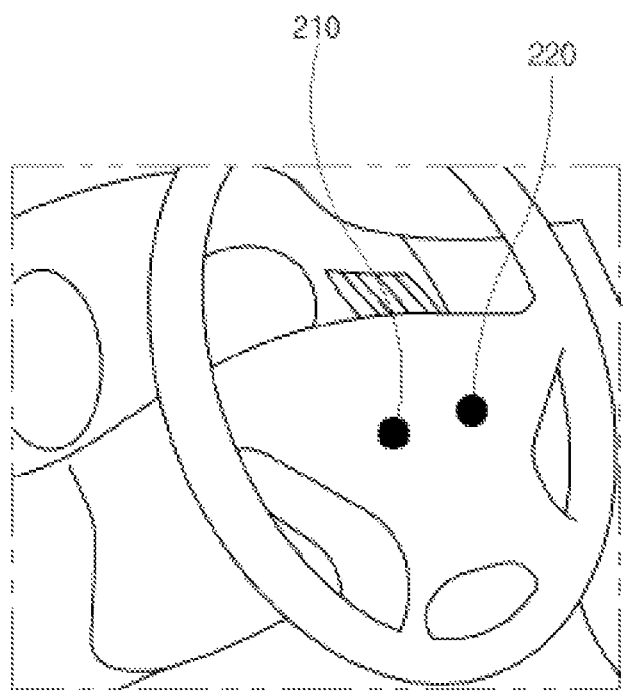
FIG. 2 is an example screen showing a mounting status of a touch detection unit according to an exemplary embodiment of the present invention.

In an exemplary embodiment in which the touch detection unit 20 is implemented as two touch sensors, that is, as shown in FIG. 2, when the first touch sensor 210 is mounted on the left side of the steering wheel and the second touch sensor 220 is mounted on the right side of the steering wheel, the touch pattern recognition unit 30 recognizes that the driver's touch position moves to the left or right if the first touch sensor 210 detects the driver's touch and subsequently the second touch sensor 220 detects the driver's touch, or if the second touch sensor 220 detects the driver's touch and subsequently the first touch sensor 210 detects the driver's touch. As another example, the number of touches that occur alternately between the first touch sensor 210 and the second touch sensor 220 can be recognized as a different touch pattern, or as a single touch pattern, regardless of the number of times depending on how the touch pattern recognition unit 30 is configured.

In another exemplary embodiment in which the touch detection unit 20 is implemented as a touch panel, the touch pattern recognition unit 30 detects reciprocating drag motions/movements, and recognizes that the driver's touch position is moving from the left to the right, and back again. The reciprocating drag motions/movements means that a driver drags from a first point on the touch panel to a second point and then, subsequently back to the first point. Here, the number of the reciprocating drag motions/movements may be recognized as a different touch pattern or as a single touch pattern regardless of the number of times depending on how the touch pattern recognition unit 30 is configured.

While the above description addresses the exemplary embodiment using two touch sensors are implemented, it should be noted that it is possible to detect more touch patterns using two or more touch sensors.

The controller 40 identifies a horn sound corresponding to the touch pattern recognized by the touch pattern recognition unit 30 from the storage unit 10 and sends it to the horn output unit 50. The horn output unit 50 outputs the horn sound sent from the controller 40.

Figure 3:
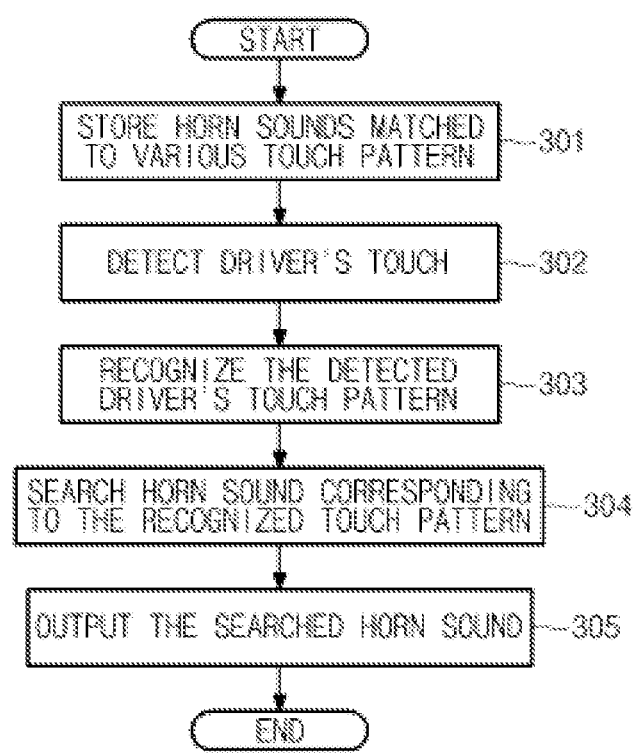
FIG. 3 is a flowchart illustrating a horn control method using a touch pattern according to an exemplary embodiment of the present invention.

FIG. 3 is a flowchart illustrating a horn control method using a touch pattern according to an exemplary embodiment of the present invention. First, the storage unit 10 stores horn sounds matched to various touch patterns (301). Then, the touch detection unit 20 equipped in a steering wheel of a vehicle detects a driver's touch (302). The touch pattern recognition unit 30 recognizes the detected touch pattern of the driver's touch detected by the touch detection unit 20 (303). Next, the controller 40 searches for, and identifies, a horn sound corresponding to the touch pattern recognized by the touch pattern recognition unit 30 in the storage unit 10 (304). Then, the horn output unit 50 outputs the horn sound sent from the controller 40 (305). Through this process, it is possible to not only produce an appropriate horn sound suitable to an emergency situation, but also to output various horn sounds appropriate to a variety of non-emergency situations, as described in detail above, without increasing the number of switches, or effort required by a driver.

As described above, according to the present invention, a driver's various touch patterns inputted by a capacitive touch detecting device equipped in a steering wheel of a vehicle can be recognized and used to output a corresponding horn sound, and thus an appropriate horn suitable to a situation can be honked.

Also, according to the present invention, the driver's various touch patterns inputted by the capacitive touch detecting device equipped in the steering wheel of the vehicle can be recognized to output a corresponding horn, so that there is no need to incorporate addition horn switches into the design of the vehicle.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or over a Controller Area Network (CAN).

Although the above exemplary embodiment is described as using a plurality of units to perform the above process, it is understood that the above processes may also be performed by a single controller or unit.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for horn control, comprising:
   a touch detection unit in a steering wheel of a vehicle configured to detect a driver's touch;
   a touch pattern recognition unit configured to recognize a touch pattern in the driver's touch detected by the touch detection unit;

a storage unit configured to store a plurality of horn sounds, wherein each horn sound corresponds to a touch pattern; and a controller configured to identify a horn sound from the plurality of horn sounds corresponding to the touch pattern recognized by the touch pattern recognition unit in the storage unit and to communicate an output command to a horn output unit, the horn output unit configured to receive the output command and output the identified horn sound of the plurality of horn sounds according to the touch pattern.

2. The apparatus of claim 1, wherein the touch pattern recognition unit is configured to recognize at least one touch pattern selected from the group consisting of number of touch times, number of touches within a time period, left to right direction of touch, right to left direction of touch, top to bottom direction of touch, bottom to top direction of touch, counterclockwise touch, clockwise touch, number of touch points, and any combination thereof.

3. The apparatus of claim 1, wherein the touch detection unit is configured to detect a driver's touch as a capacitive type.

4. The apparatus of claim 3, wherein the touch detection unit comprises a capacitive touch panel.

5. The apparatus of claim 3, wherein the touch detection unit comprises first and second capacitive touch sensors.

6. The apparatus of claim 5, wherein the first and second capacitive touch sensors are asymmetrically located on the steering wheel with respect to a center point of the steering wheel.

7. The apparatus of claim 4, wherein the touch panel is substantially centrally located on the steering wheel.

8. The apparatus of claim 1, further comprising an input device configured to allow a user to store sounds on the storage unit.

9. A method for horn control, comprising:
storing horn sounds on a storage unit, wherein the horn sounds are matched to at least one touch pattern;
detecting a driver's touch by a touch detection unit located on a steering wheel of a vehicle;
recognizing the detected touch pattern;
identifying, with a controller, a horn sound of the plurality horn sounds corresponding to the recognized touch pattern; and
outputting the identified horn sound of the plurality of horn sounds to a horn output unit.

10. The method of claim 9, wherein the touch pattern is selected from the group consisting of number of touch times, number of touches within a time period, left to right direction of touch, right to left direction of touch, top to bottom direction of touch, bottom to top direction of touch, counterclockwise touch, clockwise touch, number of touch points, and any combination thereof.

11. The method of claim 9, further comprising:
inputting at least one user's horn sound to the storage unit; and
configuring the control to assign each of the at least one user's horn sound to a particular touch pattern.

12. The method of claim 11, further comprising:
deleting the at least one user's horn sound from the storage unit.

13. A non-transitory computer readable medium containing program instructions executed by a processor or controller, the computer readable medium comprising:
program instructions that store horn sounds on a storage unit, wherein the horn sounds are matched to at least one touch pattern;
program instructions that detect a driver's touch by a touch detection unit located on a steering wheel of a vehicle;
program instructions that recognize the detected touch pattern;
program instructions that identify a horn sound from the plurality of horn sounds corresponding to the recognized touch pattern; and
program instructions that output the identified horn sound of the plurality of horn sounds to a horn output unit.

14. The non-transitory computer readable medium of claim 13, further comprising:
program instructions that input at least one user's horn sound to the storage unit; and
program instructions that configure the control to assign each of the at least one user's horn sound to a particular touch pattern.

15. The non-transitory computer readable medium of claim 14, further comprising:
program instructions that delete the at least one user's horn sound from the storage unit.

* * * * *